J. S. HYATT & J. W. HYATT.
Improvement in Process and Apparatus for Manufacturing Pyroxyline.
No. 133,229. Patented Nov. 19, 1872.
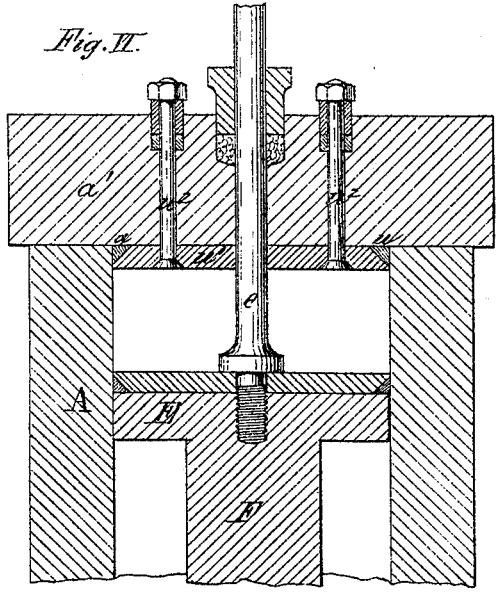
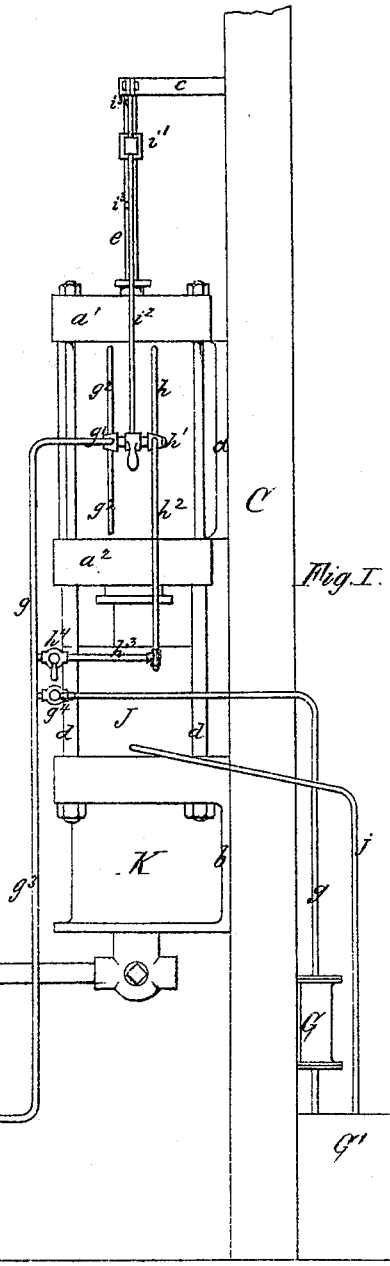
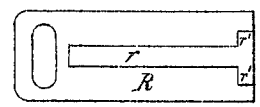
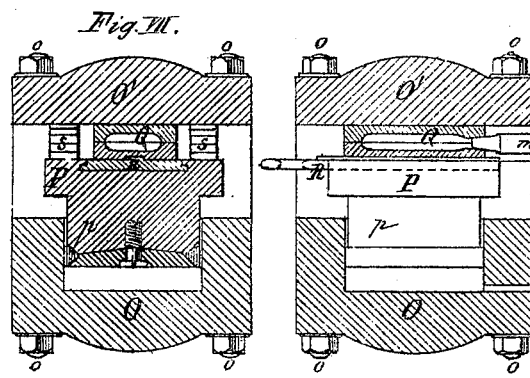
Witnesses: Edward Wilhelm, John J. Bonner
Inventors: J. Smith Hyatt, John W. Hyatt
by Jay Hyatt, Atty.

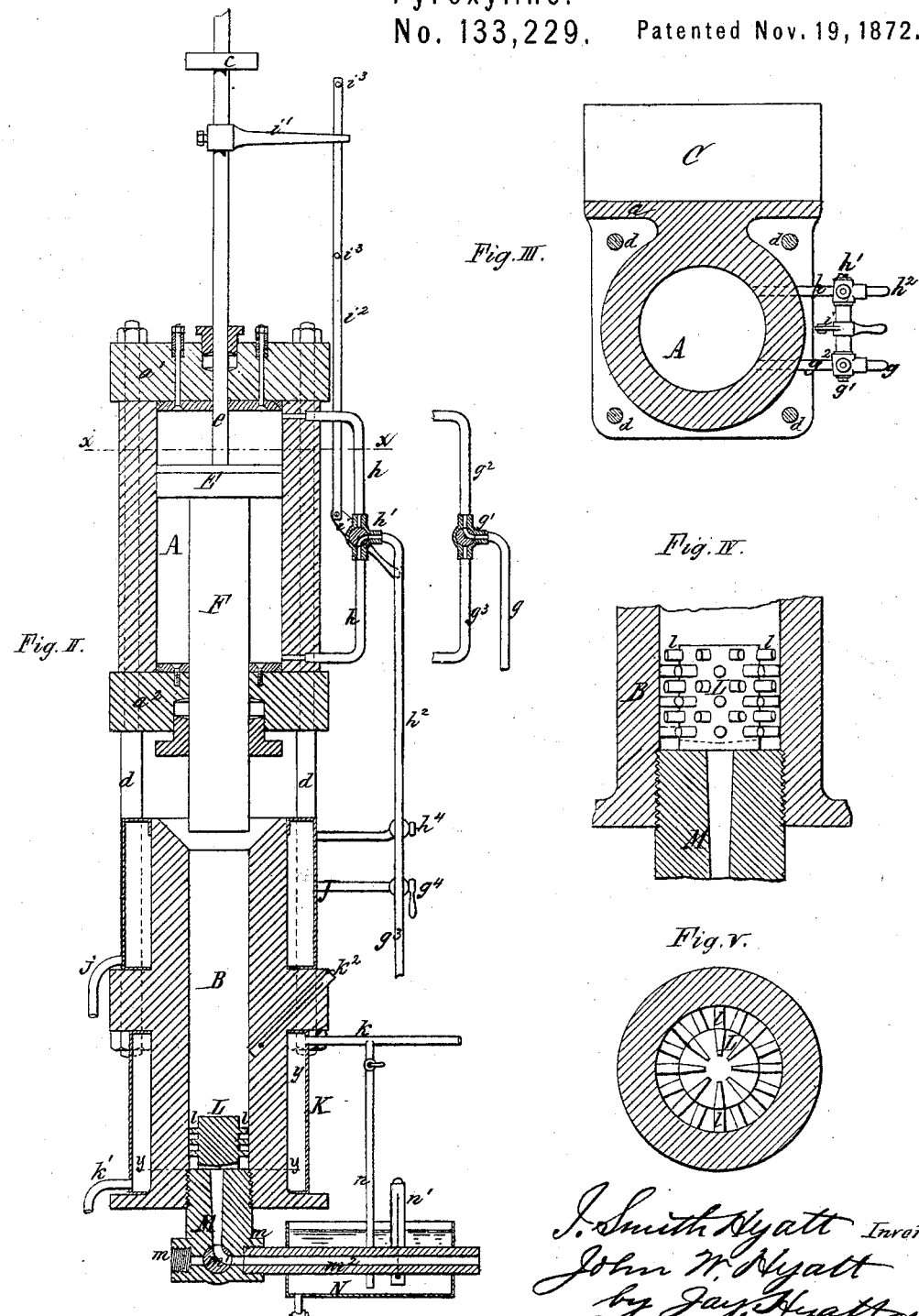

UNITED STATES PATENT OFFICE.

I. SMITH HYATT AND JOHN W. HYATT, OF ALBANY, NEW YORK, ASSIGNORS TO THE CELLULOID MANUFACTURING COMPANY, OF SAME PLACE.

IMPROVEMENT IN PROCESSES AND APPARATUS FOR MANUFACTURING PYROXYLINE.

Specification forming part of Letters Patent No. 133,229, dated November 19, 1872.

*To all whom it may concern:*

Be it known that we, I. SMITH HYATT and JOHN W. HYATT, of the city and county of Albany and State of New York, have invented an Improved Process and Apparatus for Manufacturing Celluloid, or Compounds of Pyroxyline, or Soluble Cotton, of which the following is a specification:

Soluble cotton, or pyroxyline, as used in this specification, means, as is generally understood, cotton or other vegetable fiber which has been treated with sulphuric and nitric acids, in certain proportions, by well-known processes, so as to render the fiber thus treated soluble in certain well-known solvents. Our invention relates to the conversion and manufacture of pyroxyline or soluble cotton into a solid, (which we have denominated "celluloid,") in accordance with a general process secured to us by Letters Patent of the United States, dated July 12, 1870, to which Letters Patent reference is here made for a full description of said process.

The principal feature of the process described in our said patent consists in employing camphor gum as a solvent of pyroxyline-pulp, by thoroughly mixing the comminuted camphor gum with the pyroxyline, and then subjecting the compound to heavy pressure in a heated mold, which dissolves the gum camphor, transforms the pyroxyline, and compacts the compound into a comparatively solid mass at one operation.

Our invention consists, first, in the method or process of drying the prepared mixture of soluble cotton and gum camphor by first compressing the moist pulpy compound into thin cakes of convenient size, preferably about one-fourth to one-half an inch in thickness, and arranging then these cakes in a pile, with intermediate layers of paper or other absorbent material, and subjecting the pile to pressure in a hydraulic or other suitable press, by which process the material is uniformly and sufficiently relieved of its moisture, while the compression of the material and exclusion of the air prevent all danger of the ignition of the material, which, from its inflammable nature, is rendered more or less liable, when it is exposed to the sun or to the heated air of a drying-room; second, in the process of manufacturing celluloid by the use of camphor gum or other solvent which becomes active under heat and pressure, the subjecting of the mixture of pyroxyline and solvent material to pressure by means of a plunger in a heated cylinder provided with a discharge nozzle or pipe, the cylinder being of sufficient length to cause the conversion of the pyroxyline to take place while the material is being gradually forced through the cylinder, so that, by replenishing the cylinder as it becomes partially empty, a gradual discharge of the celluloid or converted material is effected in the form of a continuous rod, bar, or sheet, as may be desired, and as is hereinafter more fully described; third, in the process of dissolving or transforming pyroxyline by means of camphor gum or other equivalent solvent which becomes active when melted, the subjecting of the pyroxyline and solvent to pressure by means of a plunger in a cylinder which is unequally heated in such a manner that the mixed material will first be compacted in the colder portion before the solvent is melted and the process of transformation commences, whereby the air is allowed to more freely escape, and is completely expelled, while the conversion of the pyroxyline is effected in another and hotter portion of the cylinder, as the mass is forced through it, as is hereinafter described; fourth, in the arrangement of a cold-water jacket around the upper portion or receiving end of the heated converting-cylinder, so as to prevent the melting of the solvent and the partial conversion of the pyroxyline before it has been properly compressed, as the premature conversion of the pyroxyline in this end of the cylinder would operate to prevent the free escape of the air during the compression of the mass; fifth, in the combination, with a converting-cylinder provided with a cold-water jacket around the receiving end thereof, of a steam or hot-water jacket arranged around the lower portion or discharge end thereof, for melting the camphor gum and facilitating the transformation of the pyroxyline before it is discharged from the cylinder; sixth, in the arrangement with the cold-water jacket of the converting-cylinder of the escape-pipe of the hydraulic engine which communicates with and supplies water to the said water-jacket; seventh, in the arrangement with the upwardly-projecting piston-rod of the hydraulic engine and the supply and escape pipes thereof of two three-way cocks, intermediate lever, and connecting-rod and arm, for operating said water-cocks or valves, as hereinafter described; eighth, in the arrangement, in the discharge end of the converting-cylinder, of a central heating and distributing core, constructed with radial pins or projections, whereby the material, before it escapes from the cylinder, is forced to pass through the annular space around the central core, and in contact with the heated surface of the cylinder, while the spurs or pins divide and mix the material, and at the same time serve to conduct the heat from the cylinder to the central core; ninth, in the combination with the discharge-pipe through which the transformed material is forced from the converting-cylinder of an equalizing warm-water vessel, through which the extended discharge-pipe passes, the water keeping the pipe sufficiently warm to prevent the inner surface thereof from cooling the material in contact therewith faster than the central portion, as the unequal cooling and consequent unequal consistency of the different portions of the material will cause the central and softer portion to move faster than the outer and harder portion, and thereby destroy the homogeneousness of the mass, and render the surface of the stick or rod, as it is ejected from the pipe, rough and broken; tenth, in the combination, with the hydraulic engine, converting-cylinder, and celluloid discharge-pipe, of a mold and hydraulic clamp for holding the mold together while it is being filled with the celluloid, as hereinafter more fully explained.

General Description.

The soluble cotton or pyroxyline is first ground or comminuted in a wet condition, and the excess of water expressed therefrom. The camphor gum and pigments, as desired, are then thoroughly incorporated therewith by means of mixing-rollers or other suitable apparatus. The compound thus prepared is conveniently formed into cakes by means of a mold and follower, the bottom of the mold being made separate, and serving as a means for transferring the formed cake to the pile. These cakes are preferably made of a size about twelve inches square, and from one-fourth to one-half an inch in thickness, as it would be quite difficult to properly absorb the moisture from a cake of much greater thickness. These cakes are laid up in a pile, with a suitable layer of unsized or blotting paper or other suitable absorbent material placed between them. The pile thus formed is subjected to considerable pressure (which may be more or less) in a hydraulic or other press, which causes the intervening layers of the paper or other material to sufficiently absorb the moisture from the compound, which is rapidly and uniformly effected. During this process the compound is protected from the air, thus preventing the evaporation of the camphor, and also all liability of ignition of the material. The rapidity with which the drying is effected results in a great saving in time and in the amount of space required. The material thus dried is ready for conversion into celluloid.

In the accompanying drawing, consisting of two sheets, Figure I is a side elevation of our improved apparatus with the hydraulic-mold clamp enlarged and in section. Fig. II is a central vertical section of the apparatus without the hydraulic clamp. Fig. III is a horizontal section of the hydraulic engine in line $x\ x$, Fig. II. Fig. IV is an enlarged vertical section of the lower portion of the converting-cylinder. Fig. V is a horizontal section of same in line $y\ y$, Fig. II, showing a bottom plan of the distributing core-block therein. Fig. VI is an enlarged sectional view of the upper portion of the hydraulic engine, showing the manner of packing the head and piston thereof. Fig. VII is a vertical section at right angles to Fig. I of the mold and hydraulic clamp. Fig. VIII is a bottom plan of the sliding plate of the clamp on which the mold rests.

Like letters designate like parts in each of the figures.

A is the hydraulic engine, and B the converting-cylinder, arranged one above the other, and fastened to a post, C, by flanges $a\ b$ or in any other suitable manner. The converting-cylinder is shown cast in one piece, with a central flange through which pass vertical suspension-rods $d\ d$. The upper portion of these rods connect the heads of the hydraulic engine, and are of reduced size, so as to form a shoulder for the lower head $a^2$ to rest upon, while their upper ends are provided with nuts above the upper head $a^1$ by which the two heads are firmly secured together. E is the piston of the hydraulic engine, and F the solid plunger cast therewith, or attached thereto, and extending downward through the lower head and a suitable stuffing-box, so as to work in the bore of the converting-cylinder, in which it snugly fits. $e$ is the valve-rod, extending upward from the piston through the upper head and through a bearing, $c$, attached to the post C. G is a force-pump, receiving its supply of water from a reservoir, G', and forcing it through a pipe, $g$, to the hydraulic engine and the mold-clamp Q. The pipe $g$ leads to a three-way cock, $g^1$, from which branch the two supply-pipes $g^2$ leading to both ends of the hydraulic cylinder, while a branch pipe, $g^3$, leads to the cylinder of the hydraulic mold-clamp. The flow of water through the pipe $g$ to the cylinder and clamp is controlled by a stop-cock, $g^4$. $h\ h$ are the two water-escape pipes of the hydraulic cylinder, uniting with a three-way cock, $h^1$, from which a common escape-pipe, $h^2$, leads to the water-jacket of the converting-cylinder. A branch pipe, $h^3$, provided with a stop-cock, $h^4$, leads from the supply-pipe $g$ to the escape-pipe $h^2$. The three-way cocks $g^1$ and $h^1$ are connected together by a short rod provided with a lever, $i$. The inner arm of this lever and an arm, $i^1$, keyed to the valve-rod $e$, are connected by a vertical rod, $i^2$. The upper end of this rod slides in a hole or slot in the end of the arm $i^1$, and is provided with stop-pins $i^3$ above and below the arm, with which the latter alternately engages in actuating the cocks $g^1$ and $h^1$. The outer arm of the lever $i$ forms a handle for the attendant, by which both cocks are closed, and the supply and escape of the water shut off, by bringing the lever into a horizontal position. The cocks are simultaneously opened and the engine set in motion when required by elevating or depressing the lever. When depressed, as shown in Fig. II, the upper supply and lower escape pipes are opened, which causes the piston to descend, while a reversed and elevated position of the handle closes these pipes and opens the lower supply and upper escape pipes and reverses the piston. Assuming the valve-lever $i$ to be in its upper position, pressure is applied to the cylinder of the hydraulic engine and the mold-clamp simultaneously by opening the cock $g^4$ and closing the cock $h^4$. The resistance in the mold-clamp being less than in the hydraulic engine, the two parts of the mold are firmly clamped together before the action of the hydraulic piston forces the celluloid into the mold. By opening the cock $h^4$ and closing the cock $g^4$ the pressure is simultaneously removed from the hydraulic cylinder and the mold-clamp, the surplus of water from the latter passing through the pipe $h^3$ to the escape-pipe $h^2$, and thence to the water-jacket of the converting-cylinder, while the engine is at rest for lack of pressure and the movement of the celluloid stopped. J is the water-jacket surrounding the upper portion of the converting-cylinder, from which the escape-pipe $j$ is shown in the drawing as connecting with the reservoir, by means of which the same water is repeatedly used without waste. K is the steam-jacket surrounding the lower portion of the cylinder; $k$, the steam-supply pipe; and $k^1$, the escape-pipe thereof; and $k^2$, a thermometer fitting in a hole in the side of the cylinder for determining the temperature thereof. L is the distributing core-block, fitting in the lower end of the converting-cylinder. It is provided with radially-projecting spurs or pins $l$ at its periphery, and with radial grooves or channels in the lower end for the passage of the material from the periphery to the center and mouth of the discharge-nozzle M. This nozzle may be provided with two or more branch discharge-nozzles, $m$ $m$, closed by a three-way or other suitable cock, $m^1$, to which mold-pipes $m^2$ of various sizes and form of bore can be attached. N is the equalizing vessel, through which the mold-pipe passes. The water or other liquid in this vessel may be heated by a steam-pipe, $n$, or other suitable means, and the temperature regulated by means of a thermometer, $n'$. O is the lower and O' the upper portion of the hydraulic clamp, secured together by bolts $o$, or in any other suitable manner. The lower portion O is formed with a shallow bore or recess extending partially through it, in which fits the piston $p$ or lower end of the follower P. Q is the mold, formed in two parts in a common manner, and of the shape of the article to be produced. It is placed on the follower under the portion O' of the press, and is formed so as to receive and snugly fit, when the two halves are put together, the nozzle of the discharge-pipe leading from the stuffing or converting cylinder, the pressure together of the two parts of the mold around the end of the pipe forming a tight connection when one is required, while the mold is readily disconnected therefrom when the pressure is removed. For convenience in introducing and withdrawing the mold a sliding plate, R, fitting in dovetail ways in the face of the follower is employed for the mold to rest upon. The upper side of this plate is provided with a rib, $r$, running lengthwise and terminating at the rear end with lateral stops $r'$. The under side of the mold is made with a groove corresponding in size with the rib or way $r$, which fits therein. The plate being partially withdrawn from the clamp, a mold is arranged thereon, when, by pressing against the mold with a stick, it is slid on the plate until it strikes the stops $r'$ of the latter, when both together are slid back until the nozzle of the discharge-pipe has entered the mouth of the mold and the latter is in a condition to be clamped together. The sliding plate R is provided with an opening or handle, by which it and the mold, when filled and released by the opening of the clamp, are readily withdrawn therefrom. When light molds are employed bearing or stop blocks $s$ of the thickness of the mold are employed between the clamps to prevent the crushing of the molds, the blocks arresting the approach of the follower to the upper head when the parts of the mold have been brought firmly together. These stops are preferably made of several slightly-curved plates placed one above the other, so as to operate as an elliptic spring to force open the jaws of the clamp when the water is shut off, and form, when the plates are pressed together, a stop of the required thickness, as shown in Fig. VII. The joints at the top and bottom of the hydraulic engine are packed by means of a ring, $u$, of packing material, and a disk, $u^1$, with the edge beveled off from the inner side, and clamped to the heads of the cylinder by bolts $u^2$, as clearly shown. The disk forces the packing material in the angle at the junction of the cylinder with its heads, while the pressure of the water within operates to more effectually pack the joint. With our mode of packing the area of the heads against which the water presses is not increased above that of the cylinder, as it is when the packing is interposed in an annular recess between the end of the cylinder and heads thereof, whereby the heads and fastening thereof are subjected to less strain by our improved mode of fastening. The hydraulic piston is packed in a like manner, as clearly shown in Fig. VI; also, the piston of the mold-clamp, as shown in Figs. I and VII.

Operation.

The pyroxyline and solvent, with or without other ingredients, either before its conversion, in the condition in which it is taken from the drying pile, as above described, or in pieces or scraps of the previously-transformed or partially-transformed material or celluloid, are placed into the converting or stuffing cylinder, when water is let into the upper end of the engine by depressing the lever, as shown in Fig. II, which causes the piston and follower to slowly descend, the supply-pipes being made small for the purpose, so as to allow sufficient time for the heating of the contents of the cylinder and the conversion or softening thereof before it is forced therefrom. The water-jacket keeps the material cool until it has been compressed into the lower portion of the cylinder and the air allowed to escape. In the lower portion of the cylinder the heat from the steam-jacket melts and renders active the solvent of the pyroxyline, or redissolves and agglomerates the scraps of the previously-converted material, when the contents are gradually forced through the annular space around the core L among the pins, which thoroughly divides and mixes up the mass and brings every portion thereof in contact with the heated surface of the cylinder, core, or pins, thereby insuring a complete transformation and a homogeneous compound. The celluloid is now forced through the discharge-nozzle into the pipe-mold $m^2$, maintained at suitable and equable temperature by the liquid of the equalizing vessel N, from which it may be discharged, when desired, in the form of a bar, sheet, or stick, according to the shape of the bore of the pipe.

Instead of forming the celluloid into bars, rods, &c., as above described, the material may be forced from the discharge pipe or nozzle, with or without the interposed equalizing warm-water vessel, directly into a mold of the form of the article required to be produced. In such case the water is turned on the hydraulic press, as hereinbefore described, at the same time it is on the engine, so that the follower will have been elevated sufficiently to clamp the parts of the mold together by the time the material begins to enter the same. The area of the piston of the press should be sufficiently large to prevent the pressure from the engine forcing the mold apart.

The mold being filled, the cocks $g^4$ and $h^4$ are reversed, shutting off the supply of water from the force-pump G, and opening the escape from the engine and the mold-clamp, whereby the hydraulic piston is arrested in its movement, and the piston and follower of the mold-clamp permitted to descend, and the mold to be withdrawn and another one substituted. Water is again led into the press so as to clamp the mold together, when the engine is again started and the second mold filled, and so on until the stuffing-cylinder is exhausted, or nearly so, of its contents, when the engine is reversed, the converting-cylinder refilled, and the above process continued.

What we claim as our invention is—

1. In the manufacture of celluloid, the process of drying the prepared mixture of pyroxyline or soluble cotton and camphor gum, or its equivalent, by first compressing the mixture into thin cakes and arranging them in a pile with interposed layers of bibulous paper or other porous absorbent material, and then subjecting the pile thus formed to pressure, substantially as hereinbefore set forth.

2. As a part of the process of manufacturing celluloid or compounds of pyroxyline by the use of camphor gum or other solvent which becomes active under heat, the subjecting of the mixture of the pyroxyline and solvent to pressure by means of a plunger in a heated cylinder, provided with a discharge-nozzle, whereby the material is transformed, and the celluloid discharged from the cylinder in a continuous rod, bar, or sheet, as hereinbefore set forth.

3. As a part of the process of dissolving or transforming pyroxyline by means of camphor gum or other equivalent solvent which becomes active when melted, the subjecting of the pyroxyline and solvent to pressure in the upper portion of a cylinder, which upper portion is kept sufficiently cool to prevent the melting of the solvent and transformation of the material therein during the compression of the material and expulsion of the air, while the lower portion of the cylinder is heated at a temperature sufficiently high to melt the solvent and transform the pyroxyline, which is forced through the same and out of a discharge-nozzle, as hereinbefore set forth.

4. The arrangement of the cold-water jacket around the upper portion or receiving end of the heated converting-cylinder, substantially as and for the purpose set forth.

5. The combination and arrangement, with the converting-cylinder B, of the cold-water jacket J and steam-jacket K, as and for the purpose set forth.

6. The arrangement, with the hydraulic engine and cold-water jacket of the converting-cylinder, of the escape-pipe $h^2$ leading from the engine to the said water-jacket for supplying water thereto, as shown and described.

7. The arrangement, with the piston-rod of the hydraulic engine and the supply and escape pipes thereof, of the three-way cocks $g^1$ $h^1$, intermediate lever $i$, connecting-rod $i^2$, and arm $i^1$, as hereinbefore set forth.

8. The arrangement of the central heating and distributing core-block L in the lower or discharge end of the converting-cylinder, substantially as hereinbefore set forth.

9. The combination, with the heated stuffing-cylinder and mold-pipe $m^2$, of the warm-water vessel N for preventing the premature cooling of the mold-pipe, as hereinbefore set forth.

10. The combination, with a hydraulic engine, a stuffing-cylinder and discharge-pipe thereof, of a mold and a hydraulic-press clamp, substantially as hereinbefore set forth.

I. SMITH HYATT.
     JOHN W. HYATT.

Witnesses:
 J. M. LAWSON,
 JAMES GRAY.